United States Patent [19]

Coast

[11] 4,433,634
[45] Feb. 28, 1984

[54] TRACKED, AMPHIBIOUS VEHICLE WITH TRACK SECUREMENT AND GUIDE MEANS

[75] Inventor: John B. Coast, Baton Rouge, La.

[73] Assignee: Coast Machinery, Inc., Baton Rouge, La.

[21] Appl. No.: 346,018

[22] Filed: Feb. 5, 1982

[51] Int. Cl.³ .................................................. B63C 35/34
[52] U.S. Cl. ................................... 114/270; 180/9.2 R
[58] Field of Search .................. 114/270; 440/95, 96, 440/97; 180/9.1; 305/56, 24, 25

[56] References Cited

U.S. PATENT DOCUMENTS

| | | | |
|---|---|---|---|
| 830,447 | 9/1906 | Maccallum | 440/95 |
| 2,730,064 | 1/1956 | Eyring | 440/96 |
| 2,917,095 | 12/1959 | Galanot | 305/56 |
| 3,111,349 | 11/1963 | Tucker, Sr. | 305/24 |
| 3,418,961 | 12/1968 | Gregg | 114/270 |
| 3,879,092 | 4/1975 | Rose | 305/24 |
| 3,951,093 | 4/1976 | Poche | 114/270 |
| 4,082,371 | 4/1978 | Werner et al. | 305/56 |

Primary Examiner—Trygve M. Blix
Assistant Examiner—Ivy M. Shum
Attorney, Agent, or Firm—Charles C. Garvey, Jr.

[57] ABSTRACT

A tracked, amphibious vehicle with track securement and guide means for the track to prevent "track throw" or loss. The vehicle includes two spaced, parallel pontoons joined by a centrally located operator's platform structure, with each pontoon having a moveable track for propulsion, with the track supported on its pontoon by fore and aft sprocket wheel sets and a series of larger bogie wheels at its bottom and smaller guide wheels at its top. Each track comprises a parallel set of rubber, continuous, endless belts joined together by a series of laterally disposed cleats with drive lugs, which lugs are engaged by the teeth of the sprocket wheels. For track securement in a first embodiment (FIG. 5) every fifth cleat includes an inwardly projecting, polyethylene T-hanger retainer which matingly fits and rides in a beam guide attached to the bottom of the pontoon and extends from the initial bottom bogie wheel to the entry of the aft, drive sprocket. In a record embodiment (note FIG. 6) the securing parts are reversed with the T-retainer element being a continuous beam fixed to the bottom of the pontoon and with the mating receptive elements being on the cleats of the track. For track guidance every cleat includes a pair of outwardly facing, inwardly directed, vertical guide members which face the inward or interior sides of the upper and lower bogie wheels to prevent any lateral forces from moving the track off its pontoon.

12 Claims, 6 Drawing Figures

TRACKED, AMPHIBIOUS VEHICLE WITH TRACK SECUREMENT AND GUIDE MEANS

BACKGROUND OF INVENTION

1. Field of the Invention

The present invention relates to an amphibious, all terrain type (ATV) vehicle, such as for example a marsh craft, and more particularly to a tracked ATV utilized for travel over different types of terrain, such as swamps, bogs and the like, and for travel cross-country with obstacles of different character, with various degrees of inclination.

2. Prior Art

Various types of amphibious crafts or ATV's are known in the art. One commonly known and cited is U.S. Pat. No. 2,546,523 issued Mar. 27, 1951 to Reynolds which described a marsh buggy vehicle comprising a pair of spaced, elongated pontoons disposed and secured in a parallel relationship, two endless chains passing about each pontoon over sprockets mounted on transverse, driven shafts. The chains were joined together transversely by slats which form the threads for the craft.

Another example of an amphibious marsh vehicle is shown in U.S. Pat. No. 3,842,785 issued Oct. 22, 1974 to Rivet. The apparatus described by Rivet included two pontoons, with two endless drive chains carried in channels disposed on top and bottom of the pontoons. The cleats attached to the chains have plastic blocks which are secured to the web of the cleats and bear against the top and bottom of the pontoons.

These and other similar vehicles have a number of operating problems, one of the most common of which is chain wear. In operation the chain is exposed to the mud, sand and water, and to prolong the chain life it is a common practice to lubricate the elements of the chain in places of connection. But any lubricant applied to a chain has a tendency to catch and collect dirt and sand, which causes rapid wear of the chain elements, particularly between the carrier roller and pin.

To solve this problem some inventors have come up with the idea of using rubber belts instead of metal chains, as for example in U.S. Pat. No. 3,217,687 issued Nov. 16, 1965 to Erkelson et al., which describes an amphibious vehicle having endless belts provided for operation mainly in water when the belts are substantially submerged.

But such vehicles face another problem when traveling on the ground, this problem being commonly known as "chain" or "track throw," which arises from the inability of many such designs to provide efficient means for securing a chain or a belt in its place over the driving sprockets or wheels.

Additionally, many "marsh buggies" have had the problem of "track sag," which further adds to the problem of track throw.

These problems have been known in the art for a long period of time and, to prevent rapid wear of the elements, a number of solutions have been suggested. In some cases special pads are attached to the sides of a chain in order to reduce friction and thus to eliminate the problem. While these and other solutions have proven to be satisfactory to some extent, they still have not provided full reliability.

Other prior patents showing other exemplary amphibious type vehicles are listed below:

| Patentee(s) | U.S. Pat. No. | Issue Date |
|---|---|---|
| J. A. Dorst | 2,068,664 | Jan. 26, 1937 |
| J. M. Hait | 2,404,489 | July 23, 1946 |
| B. A. Swennes | 2,487,397 | Nov. 8, 1949 |
| F. F. Reynolds | 2,546,523 | March 27, 1951 |
| H. L. Prosser | 3,108,564 | Oct. 29, 1963 |
| A. H. Pitchford | 3,299,849 | Jan. 24, 1967 |
| F. B. Gregg | 3,418,961 | Dec. 31, 1968 |
| M. E. Hebert | 3,474,751 | Oct. 28, 1969 |
| L. H. Roy | 3,487,802 | Jan. 6, 1970 |
| M. E. Hebert | 3,611,979 | Oct. 12, 1971 |
| A. V. Brusacoram | 3,760,763 | Sept. 25, 1973 |

SUMMARY DISCUSSSION OF INVENTION

The present invention overcomes all of the prior art difficulties in a simple and straight-forward manner by providing track means neutral to rust or like damage due to environmental conditions and by providing efficient means for securing and guiding the track means in relation to the pontoons and guide driving means.

It is the base object of the present invention to provide an amphibious pontoon-type vehicle with increased tack life and high speed capabilities.

It is also an object of the present invention to provide a pontoon-type amphibious vehicle having corrosive-resistant track running over the top and bottom of each pontoon which do not need any lubrication and result in reducing the cost of vehicle operation.

It is another object of the present invention to provide an amphibious vehicle having increased buoyancy due to the reducing of the weight of the vehicle without giving up its operational characteristics.

A further object of the present invention is to provide an amphibious vehicle having support bogie wheels cooperating with a track guide assembly.

It is still a further object of the present invention to provide an amphibious vehicle wherein the tracks have "T"-shaped hanger support, retainer systems for better securing the position of the tracks about the pontoons.

BRIEF DESCRIPTION OF DRAWINGS

These together with other objects and advantages, which will become apparent, reside in the details of construction and operation as more fully described hereinafter, reference being had to the accompanying drawings, forming a part thereof, wherein like numerals refer to like parts, and in which.

DETAILED DESCRIPTION OF PREFERRED EMBODIMENTS

Figure 1:
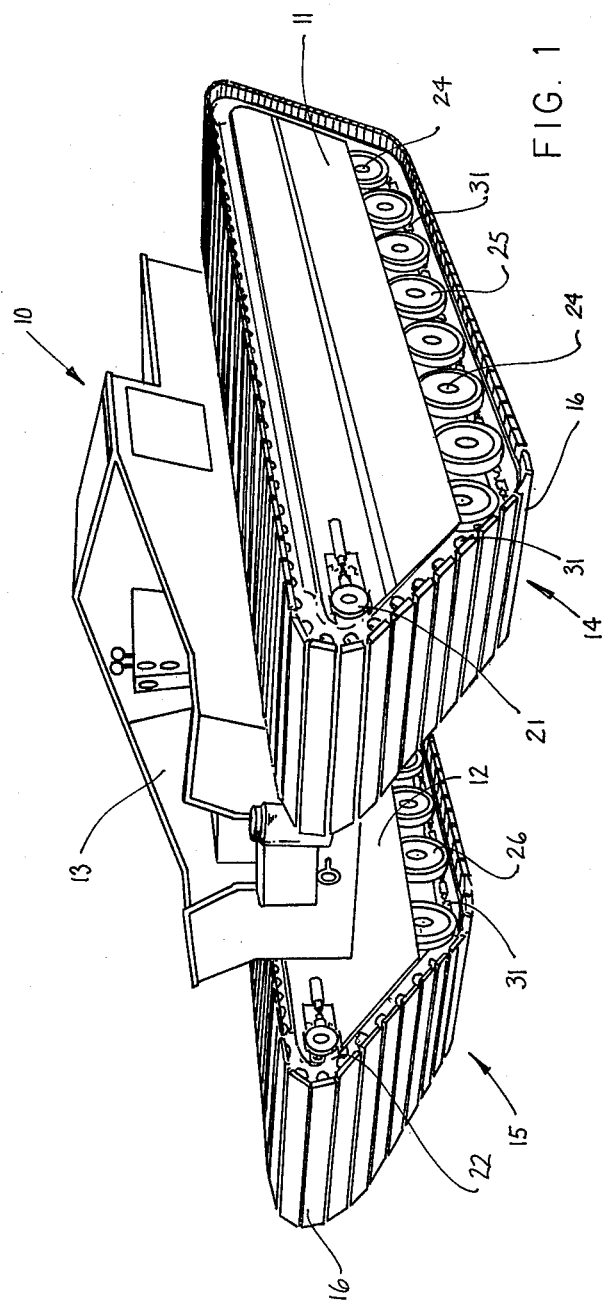
FIG. 1 is a front, perspective view of the preferred embodiment of the tracked amphibious vehicle according to the present invention.

Referring now to the drawings, number 10 indicates an amphibious marsh craft constructed as a first preferred embodiment in accordance with the present invention. The craft 10 includes two, parallel, buoyant, port and starboard pontoons 11 and 12, respectively, which more specifically are formed with substantially flat, bottom and top walls and upwardly extending parallel side walls (note FIG. 3) and at each end thereof with flat front and rear walls diverging upwardly.

An operating and load carrying, operator platform 13 is rigidly mounted at the forward and after ends of the vehicle 10 connecting the pontoons 11, 12 together and maintaining them in a parallel relationship.

The buoyancy of the vehicle 10 in water would be such that the water level can be held to a point substantially at the area of the upper pontoons 11 and 12 (note water line "W.L." in FIG. 1).

Figure 2:
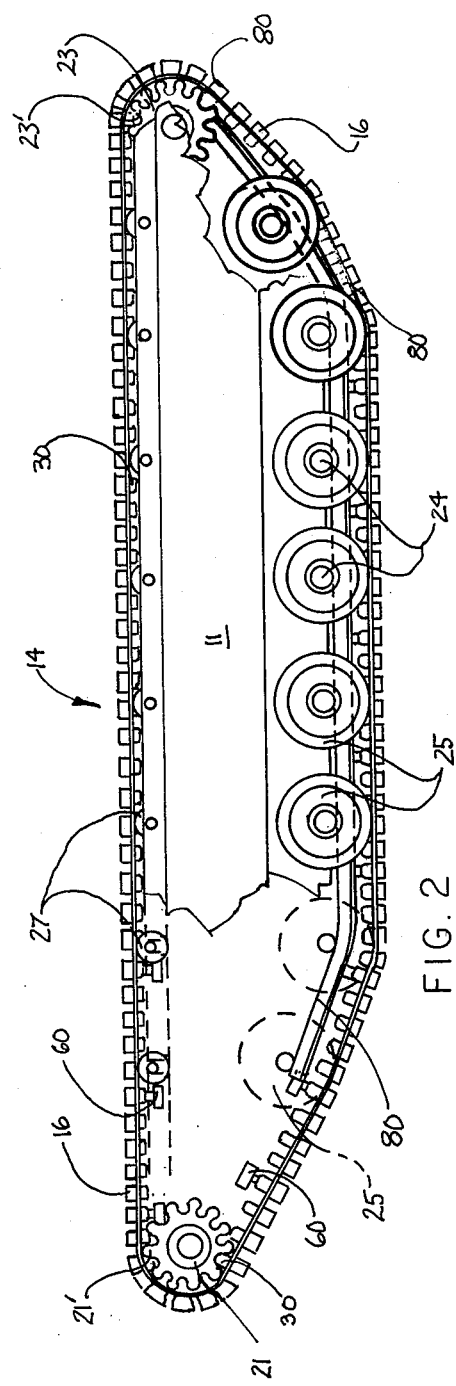
FIG. 2 is a partial, side view of the embodiment of FIG. 1 with parts broken away showing one of the tracks in cooperation with a first embodiment of the invention's track guide assembly and T-hanger support system.

As can best be seen in FIGS. 1 and 2, endless moveable tracks 14 and 15 are disposed around the pontoons 11, 12 and are held in looped configuration by the front sprockets 21, 22, and the rear sprockets 23 (starboard one not illustrated), and a series of lower bogie wheels 25, 26, respectively.

The tracks 14, 15 are comprised essentially of an endless, continuous structure which has good wear and water-resistant characteristics and is flexible and resilient enough to stretch around the pontoons 11, 12 and their curved ends. The tracks 14, 15 can provide additional buoyancy to the vehicle when made of light weight material.

Each track 14, 15 includes two, continuous, endless, flexible, resilient belts 28 with cleats 16 mounted thereon connecting them together. The cleats 16 are of such length as to at least overlay and underlay its pontoon in its transverse or lateral dimensions (note FIG. 3). In the preferred embodiment the cleats 16 are defined by a series of uniformly and longitudinally spaced plates having a flat outer surface and straight sides.

However, it should be appreciated that the cleats 16 may also take the form of other designs, such as with sub-cleats projecting outwardly from the body of the cleat section to establish positive engagement with the ground or water surface. It should be appreciated that the cleats 16 assist in engaging the water when the vehicle moves through a swamp, marsh or the like so as to propel the vehicle 10.

The opposed, rear sprockets (for example the aft, port one 23 shown in FIG. 2) are mounted on an axle which may be driven in any desired manner such as for example by a hydraulic drive unit (preferred), electric drive unit, or any other heavy duty drive means. The front and rear sprockets 21, 22 and 23, serve the dual purpose of not only seating and driving the endless tracks 14, 15, but also as a means for adjusting for any unnecessary slack in the belts 14 and 15.

As can best be seen in FIG. 2, each sprocket is provided with a plurality of equiangularly spaced, drive lug legs 21', 23' for engagement with drive lugs 102 (note FIG. 4) on the trackd 14 to insure movement of track 14 thereabout, thereby propelling vehicle 10 in response thereto as will be more fully described below.

The endless tracks 14, 15 are supported for and guided during movement by a plurality of opposed, longitudinally spaced pairs of bottom, bogie wheels 25, 26, respectively. As can be best seen in FIG. 3, the spaced pairs of bogie wheels 25 are mounted on fixed tubular shafts 24 having a flanged bushing inserted into each of their ends. Shafts 24 supports bogie wheels 25 for free rotation about their axes.

An upper set of opposed, pairs of smaller, longitudinally spaced guide wheels 27 (note FIG. 3) is included on the upper side of the pontoon 11 directly above the lower set of bogie wheels 25 (note phantom lines 29), and the track 14 is carried by the upper set of guide wheels 27. The lower bogie wheels 25, 26 serve not only as weight-carrying wheels to support the vehicle 10 but also, along with upper guide wheels 27, as a means to keep the endless tracks 14, 15 laterally in line while the vehicle 10 is propelled, in such a manner that the tracks 14, 15 are guided and maintained in place along their entire length during their movement over and around the sprockets 21, 23 and the various bogie and guide wheels 25, 27.

Figure 3:
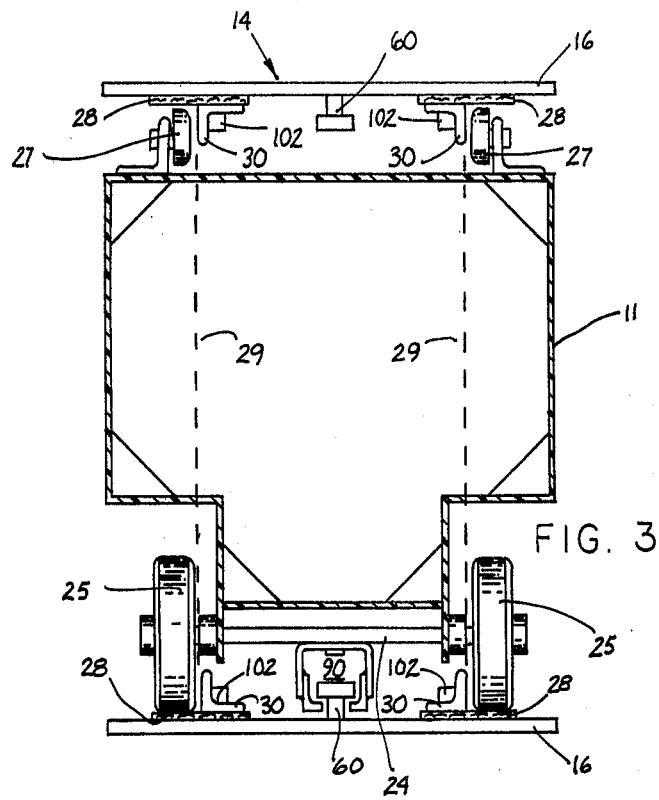
FIG. 3 is a cross-sectional, partial view of the exemplary port pontoon and associated track system of the embodiment of FIG. 1.
Figure 4:
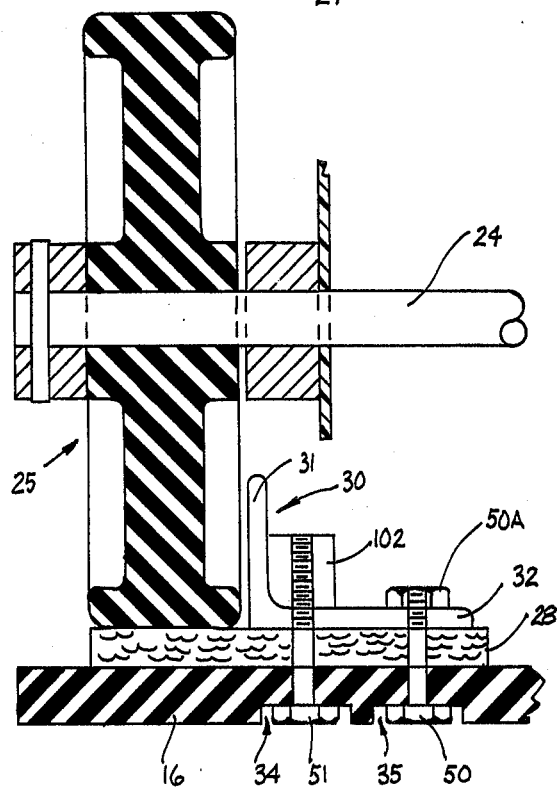
FIG. 4 is a close-up, fragmentary, cross-sectional view of the track guide support assembly in cooperation with a bogie wheel in the track system of FIG. 3.

To assist in this tracking function, the track guide assembly of the invention is provided. Reference now will be made to FIGS. 3 & 4, wherein number 30 indicates a series of belt guides 30 mounted on the cleats 16 and the continuous, endless belts 28 and attached thereto. Each guide 30 includes two portions 31, 32 bent at an angle of ninety degrees in relation to each other.

A perpendicular, inwardly extending portion 31 is disposed adjacent the inboard side of bogie wheel 25 in a substantially parallel, facing relationship to the lowermost, interior portion thereof. The horizontally extending portion 32 is supported by and is rigidly attached to track 14.

As seen in FIG. 4, cleat 16 has two counterbores 34, 35, the top walls of which are provided with openings having common axes with corresponding openings in the belt 28 and the track guide 30. Also, as shown in FIG. 4 drive lug 102 is fixed by bolt 51 through cleat 16, to the track 14 and, as can be seen best in FIG. 2a rounded tip at its end to fit into the drive legs 21', 23' of the sprockets 21, 23. The opposed guides 30 and drive lugs 102 are provided on the belts 28 over each cleat 16.

The center portion of drive lug 102 is provided with a threaded opening to receive and engage the bolt 51 inserted through corresponding openings for fixedly connecting together belt 28 and cleat 16 with track guide 30 and drive lug 102. Bolt 51 is secured in its position by the internal threads of lug 102, but it should be noted that the bolt means described is exemplary and can be substituted for by many other means.

To insure the position of, and to key belt 28 in relation to, the track guide 30 and drive lug 102, a second bolt 50 is provided, passing through the second recess and opening 35 of cleat 16 and corresponding openings in belt 28 and portion 32 of guide 30 and secured by nut 50A.

In operation drive lug 102 engages in the spaces between the spaced drive lug engaging legs 21', 23', thus providing for the propelling of belts 28 about pontoon 11, and guides 30 insure the proper, lateral positioning of the belts 28 and hence track 14 in relation to the sprockets 21, 23 and bogie and guide wheels 25, 27.

A first embodiment of a T-hanger support system will now be described and reference will be made particularly to FIGS. 3 and 5.

As illustrated, cleat 16 has a further, downwardly opening recess 71 in its midway portion, and opening 72 in its top portion. A T-shaped retainer 60 is fixedly mounted upon cleat 16 through its correspondent opening 63 with opening 72. The T-shaped retainer 60 has a lower cylindrical, stem portion 62 and a circular, top or head portion 61, which is substantially larger in diameter than the lower portion 62.

Figure 5:
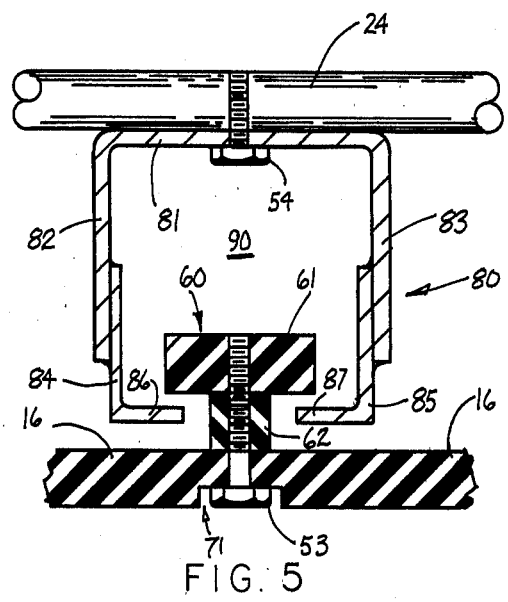
FIG. 5 is a close-up, fragmentary, cross-sectional view of the T-hanger support of FIG. 3.

As can be seen in FIGS. 2, 3 and 5, vehicle 10 is provided with a downwardly opening, centrally located, inverted U-shaped, guide beam 80 mounted on the bottom of pontoon 11 and extending along the longitudinal axis thereof, and supported by and bolted to the transversely mounted shafts 24 by means of bolts 54 or like means. As can best be seen in FIG. 2, the guide beam 80 preferrably extends from the initial bogie wheel 25' back along the other bogie wheels 25, where the track 14 engages the ground, back up to the entry area of the rear, drive sprocket 23, thus providing track guidance and retention in all key areas where track loss might otherwise occur.

Beam guide 80 generally comprises top portion 81 and parallel, spaced side portions 82 and 83. Preferrably beam guide 80 has an integral body with downwardly extending projection members 84 and 85 rigidly attached to the side wall portions 82 and 83, respectively. Each projection member 84, 85 comprises an integral body with the lowermost portion being bent at angle of ninety degrees inwardly and horizontally directed toward the space 90 formed by the U-shaped guide 80 in such a manner that the separation distance between edges 86 and 87 is larger than the external diameter of the lower cylindrical portion 62 of the T-hanger 60, but substantially smaller than the external diameter of the top, circular portion 61 of T-hanger 60. If desired the guide beam 80 could be formed from a single, continuous channel member with a slot cut in its bottom wall.

In operation each cleat bearing a T-hanger 60 would be propelled to an area below the lower portion of pontoon 11, and each T-hanger 60 is matingly received and held within space 90 formed by the side wall portions 82 and 83 of guide 80 and by projections 84 and 85. This causes track guides 30 to stay in contact with bogie wheels 25, preventing the track 14 from dropping away from pontoon 11. This causes the belts 28, to which cleats 16 are rigidly attached, to be returned in alignment with its track about pontoon 11 in case it had assumed an improper position or had slid to a side of pontoon 11, and to be held in place on the pontoon despite the application of any large lateral or twisting forces to the track.

Tests showed that the position of belts 28 and hence the track 14 remains aligned in relation to pontoon 11 if preferrably at least one-fifth (that is every fifth one) of the cleat elements 16 have been provided with the longitudinally spaced T-hanger supports 60 of the present invention. It is noted that the lugs 102 and guides 30 are also provided in a series, longitudinally spaced along the length of the belts 28 but preferrably at every cleat 16.

In the preferred embodiment the T-hangers 60 can be made of any light-weight, water-resistent material such as for example polyethylene, and the drive lugs 102 could be made of such material as urethane or aluminum covered with urethane. The interfacing, vertical portions 31 of the guides 30 likewise could be coated with urethane or other friction reducing, wear resistant surfacing.

Thus, the track 14 is securely held and maintained in line on the pontoon 11 by the opposed, lateral resistance to any lateral movement provided by the interfacings of the vertical guide legs 31 against the interior sides of the lower and upper bogie wheels and guide 25, 27 and the sides of the T-hanger retainers 60 against the sides of the guide beam 80. Additionally, the undersides of the heads 61 of the centrally located retainers 60 give vertical resistance against the upper sides of the projections 86, 87 to any downward pulling or twisting of the track 14, and thus holds the track 14 up to the bottom of the pontoon 11, preventing drooping or droping of the track 14 from the pontoon 11. This structure is one of the key aspects of the present invention.

Of course, as possible variations, the interfacings between the guides and the bogie and guide wheels could be made outboard rather than inboard as illustrated and a number of T-hanger systems or other configuration hanger retainer system could be provided rather than the single, centrally located one illustrated. However, that which is illustrated is considered superior and preferred to these variations.

It is noted that the port track 14 and its pontoon 11 and their associated elements have been described in some detail, particularly with reference to FIGS. 3-5. It should be understood that the starboard track 15 and its pontoon 12 and their associated, analogous elements are of like structure, one side being the "mirror image" of the other.

For further, exemplary, disclosure purposes only, specific details of an actual, test prototype of the first preferred embodiment included tracks 14, 15 made in part of "Goodyear" 3 ply "Pylon" belts 28 powered by a twenty-five horsepower "Onan" air cooled engine coupled to twin hydrostatic transmissions and heavy-duty, totally enclosed industrial gear boxes. Such a system eliminated the troublesome chains and belts found in most all terrain vehicles (ATV's). The resulting smooth hydraulic power allowed for fingertip control, with one control lever for each track to provide full forward or reverse without shifting or clutching. Great manueverability was achieved, with the vehicle 10 being capable of spinning aout its own center with secure tracking of the tracks 14, 15.

The total volume of the pontoon chambers 11, 12, were seventy-five and six-tenths cubic feet, which was enough to float over four thousand, seven hundred pounds. Such a vehicle 10 can carry two men plus a five hundred pound load. With a one thousand pound load, the vehicle 10 drew only twenty-five inches of water. The pontoons 11, 12 and the operator platform structure 13 were of high strength aluminum with welded seams to obtain maximum performance.

The bogie wheels 25, 26 were of high impact polyprophylene with teflon filled bearings and with stainless steel shafts 24 and thrust washers. The tracks 14, 15 each included two rubber belts 28, each one having a five inch width, with wear resistant urethane covered aluminum drive lugs 102, tough pliable plastic cleats 16, and stainless steel bolting 50-54. Such tracks are corrosion resistant and require no lubrication The test vehicle in use had a turning radius of zero, a forty-five degree minimum gradability, and a minimum side-hillcapability of thirty degrees.

Figure 6:
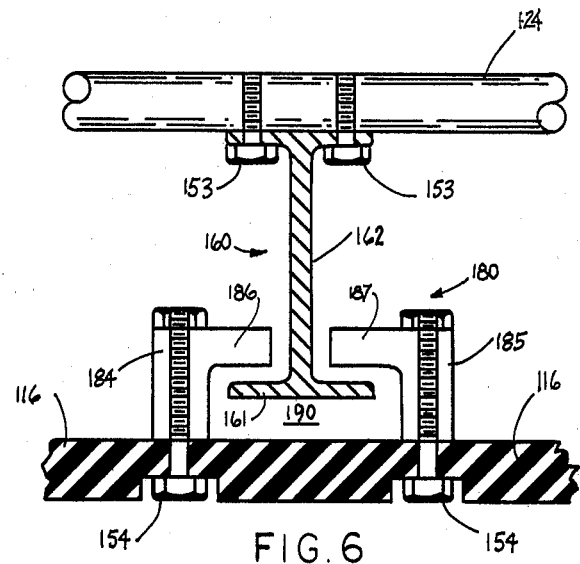
FIG. 6 is a close-up, fragmentary, cross-sectional view, similar to FIG. 5, but of a second embodiment of the T-hanger support system.

For further illustrative purposes, a second, preferred embodiment of the T-hanger system of the present invention is illustrated in FIG. 6, the inverted, "T" configured element 160 is made up of an "I" beam attached to the shafts 124 by means of bolts 153, the central portion 162 of the beam forming the stern of the "T", while the bottom portion 161 forms the head of the "T".

Beneath the "T" hanger retainer 160 are a pair of opposed vertical/horizontal projections 185, 185 with confining edges 186, 187 forming the mating guide 180. The head 161 of the "T" retainer 160 is matingly received by and held within the space 190 formed by the guide 180. Set of projections 184, 185 are bolted to the cleats 116 at selected intervals (for example every fifth one) by means of for example 154.

The embodiments of FIG. 6 functions in substantially the same way as the embodiment of FIG. 5, and like reference numbers are used in the two embodiments.

As can be appreciated by those skilled in the art, the above described tracks and track retention and guidance systems make possible the effective utilization of ATV-type vehicles for reliable travel over rough terrain, mud and excessive grades, along with excellent maneuverability over such terrain, as well as on the water or in a swamp or marsh, all without track loss.

Because many varying and different embodiments may be made within the scope of the inventive concepts herein taught, and because many modifications may be made in the embodiments herein detailed in accordance with the descriptive requirements of the law, it is to be understood that the details herein are to be interpreted as illustrative and not in a limiting sense.

What is claimed is:

1. A tracked, amphibious vehicle, comprising:
   at least two, spaced, elongated pontoons disposed generally parallel to one another;
   a platform structure supported by and structurally connecting the pontoons at their upper surface leaving a free clearance area under the platform and between the pontoons through which terrain can pass;
   driving means for propelling the vehicle
   at least one series of longitudinally spaced bogie wheels for supporting said vehicle mounted along the bottom of each of said pontoons;
   a continuous, endless belt encircling each pontoon and engaging the bogie wheels;
   ground-engaging means assembled on the outer surface of each belt and covering the pontoon bottom for providing traction to the vehicle;
   sprocket means for connecting the driving means to each of the continuous endless belts; and
   a belt retention system including lug means connected to the inner surface of the belt and cleats assembly and located to prevent the belt from moving off its longitudinal center by engaging an inner side surface of the wheels when the belt moves laterally a predetermined distance.

2. The vehicle of claim 1, wherein there is further included a plurality of spaced, track guide assemblies, each including a series of longitudinally spaced, inwardly extending, outwardly facing guide means rigidly attached to each one of said tracks at positions adjacent the portion of each track adjacent said bogie wheels, said guide means in its interfacing with said bogie wheels resisting any lateral forces tending to push the track out of its tracking engagement with its pontoon bottom.

3. The vehicle of claim 2, wherein said guide means are positioned inboard of said bogie wheels and interface with the interior sides of said bogie wheels.

4. The vehicle of claim 2, wherein there is further included a series of longitudinally spaced, smaller diameter guide wheels mounted on the top of each pontoon which likewise at their sides interface said guide members.

5. The vehicle of claim 1, wherein said U-shaped element for said T-shaped retention system includes a pair of rigidly attached, vertical side wall portions with inwardly extending, horizontally directed projections, the horizontally directed projections of which are spaced at a distance greater than the thickness of the stem portion of said T-shaped element but substantially smaller than the width of the head portion of said T-shaped element, said head portion being positioned and held within said sidewall portions and said horizontally directed projections of said U-shaped portion.

6. The vehicle of claim 5, wherein said T-shaped element is formed from a continuous "I" beam attached to the underside of said pontoon down the centerline of its track.

7. The vehicle of claim 5, wherein said U-shaped element is formed of a continuous beam attached to the underside of said pontoon down the centerline of its track.

8. The vehicle of either one of claim 6 or 7, wherein said beam extends from the initial ground contacting area of said track continuously back to the entry of the aft most track engaging means.

9. The vehicle of claim 1, wherein said series of bogie wheel form pairs connected by axles made of tubular shafts from which are supported one element of said track retention system.

10. The vehicle of claim 1, wherein said track comprises at least one flexible belt mounted for movement about the bottom and ends of its pontoon;
    a plurality of longitudinally spaced, ground engaging, transverse cleats extending across said endless belt; and
    a series of longitudinally spaced, inwardly extending drive lug means rigidly attached to said endless belt for propulsive engagement with said sprocket means.

11. A tracked, amphibious vehicle, comprising:
    a. at least two spaced, elongated pontoons disposed at least generally parallel to one another;
    b. a platform structure supported by the pontoons;
    c. driving means for propelling the vehicle associated with said platform;
    d. a series of longitudinally spaced bogie wheels supporting said vehicle mounted at the bottom area of each one of said pontoons on opposite sides of the longitudinal centerline of each one of said pontoons;
    e. a movable, continuous, endless, chainless belt for each pontoon, each belt encircling its pontoon in tracking engagement with its bogie wheels;
    f. a plurality of longitudinally spaced, ground engaging, transverse cleats extending across said endless belt and covering the bottom of the associated pontoon;
    g. a series of longitudinally spaced, inwardly extending drive lug means attached to the assembly of the cleats and belt; and
    h. sprocket means, mounted at least at one end of each one of said pontoons and connected to said driving means, for driving its respective endless track in engagement with said drive lug means.

12. The vehicle of claim 11, further comprising a track retention system which comprises:
    a first element having at least in part a U-shaped portion; and
    a mating, second, T-shaped retention element having a stem portion and a head portion, said head portion fitting within and mating with the space confined by said U-shaped portion, one of said elements being mounted on the bottom of its respective pontoon, and the other element being mounted on its respective track, said track retention system holding the track to its pontoon during movement of the vehicle.

* * * * *